(12) United States Patent
Jiang et al.

(10) Patent No.: US 6,421,090 B1
(45) Date of Patent: Jul. 16, 2002

(54) MOTION AND EDGE ADAPTIVE DEINTERLACING

(75) Inventors: Jiande Jiang; XinCheng Hong, both of San Jose, CA (US)

(73) Assignee: Trident Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/384,809

(22) Filed: Aug. 27, 1999

(51) Int. Cl.$^7$ .............................................. H04N 11/00
(52) U.S. Cl. ...................................... 348/452; 348/448
(58) Field of Search ................................ 348/452, 450, 348/448, 700

(56) References Cited

U.S. PATENT DOCUMENTS

| | | | |
|---|---|---|---|
| 4,731,648 A | * 3/1988 | Bernard et al. | 348/452 |
| 4,967,271 A | 10/1990 | Campbell et al. | 358/105 |
| 4,989,090 A | 1/1991 | Campbell et al. | 358/140 |
| 5,051,826 A | 9/1991 | Ishii et al. | 358/140 |
| 5,347,314 A | 9/1994 | Faroudja et al. | 348/448 |
| 5,625,421 A | 4/1997 | Faroudja et al. | 348/607 |
| 5,631,706 A | * 5/1997 | Tsunashima | 348/452 |
| 5,786,862 A | * 7/1998 | Kim et al. | 348/448 |
| 5,936,676 A | * 8/1999 | Ledinh et al. | 348/452 |
| 6,118,488 A | * 9/2000 | Huang | 348/452 |
| 6,118,489 A | * 9/2000 | Han et al. | 348/452 |

* cited by examiner

Primary Examiner—Victor R. Kostak
(74) Attorney, Agent, or Firm—Gray, Cary, Ware & Freidenrich

(57) ABSTRACT

A method for interpolating a pixel during the deinterlacing of a video signal, the video signal including at least two fields of interlaced scan lines, each scan line including a series of pixels having respective intensity values, includes generating a motion value representative of the motion between successive frames about the pixel, detecting an edge direction about the pixel, performing an edge adaptive interpolation at the pixel, using the detected edge direction, and performing a motion adaptive interpolation at the pixel, using the generated motion value. Apparatus for interpolating a pixel during the deinterlacing of a video signal, the video signal including at least two fields of interlaced scan lines, each scan line including a series of pixels having respective intensity values, includes a motion value generator configured to generate a motion value representative of the motion between successive frames about the pixel, an edge direction detector configured to detect an edge direction about the pixel, an edge adaptive interpolator configured to perform an edge adaptive interpolation at the pixel, using the detected edge direction, and a motion adaptive interpolator configured to perform a motion adaptive interpolation at the pixel, using the generated motion value.

24 Claims, 7 Drawing Sheets

MOTION AND EDGE ADAPTIVE DEINTERLACING

BACKGROUND

The invention relates generally to video image display and to deinterlacing video images.

Many television and video signals are interlaced, where the set of scan lines (typically 525 for NTSC color television) which make up a single video frame are not scanned or transmitted sequentially. Rather, the video frame is divided into two "fields", each field comprising every other scan line. In television, the scan lines comprising one field are transmitted first, followed by the scan lines of the second field.

However, a number of display devices, such as computer monitors, are not interlaced. Rather, these devices sequentially scan the entire display area, one scan line after another. To display an interlaced scanned sequence, such as a video signal, on such progressively scanned devices, a deinterlacing process must convert each separate field into a complete display frame that can be sequentially output to the display device. The main task of a deinterlacing process is to reconstruct the missing line between each of the scan lines of an interlaced field.

There are two primary deinterlacing methods, each with their own strengths and weaknesses. "Inter-field" techniques simply merge the data from the second field with the data from the first field to produce a completed frame. If there is no motion in the video frame, such methods yield an ideal reconstituted picture. Vertical resolution can be as good as an original noninterlaced frame. However, if there is motion within the video signal, motion effects will generally be visible to the human eye. Motion effects arise when an object, which was in one location during the scanning of the first field, has moved when the alternating scan lines of the second field are scanned. Simply combining the interlaced scan lines of the two fields yields an unacceptable rendition of the object.

"Intra-field" techniques use data only from a single field to produce a complete frame. Such methods are better suited for video frames having motion. With an intra-field technique, the values for non-existent pixels are interpolated from pixel values in the scan lines above and below the non-existent pixels. While this technique produces no deleterious motion effect, since it does not incorporate motion from one field to the next, it also does not enhance vertical resolution, since it merely interpolates from existing pixel values within a single field and does not use pixel information for missing scan lines from the second field. Also, simple intra-field deinterlacing techniques (such as simple vertical interpolation) tend to generate unacceptable jagged pictures along diagonal edges.

SUMMARY

In general, in one aspect, the invention features a method for interpolating a pixel during the deinterlacing of a video signal, the video signal including at least two fields of interlaced scan lines, each scan line including a series of pixels having respective intensity values, the method including generating a motion value representative of the motion between successive frames about the pixel, detecting an edge direction about the pixel, performing an edge adaptive interpolation at the pixel, using the detected edge direction, and performing a motion adaptive interpolation at the pixel, using the generated motion value.

Embodiments of the invention may include one or more of the following features. The motion value can be generated by comparing segments of pixels about the pixel from successive frames. The segments can include at least two consecutive pixels in a scan line. Generating the motion value can include, for each of a plurality of pixel segments from successive frames about the pixel, calculating a plurality of differences, determining the greatest of the calculated plurality of differences, and determining the motion value from a look-up table using the greatest of the calculated plurality of differences. Whether an edge exists about the pixel can be determined and the look-up table selected from a plurality of look-up tables depending upon whether an edge exists. The motion value can be generated by comparing segments of pixels about the pixel from at least three successive frames. The pixel segments for at least one of the successive frames can be stored in a feature buffer.

The edge direction can be detected by forming the respective differences for a first plurality of pixel pairs, each pixel pair comprising two pixels from scan lines respectively above and below the pixel, each pixel pair for the first plurality of pixel pairs having a first common direction, calculating a first combined difference for the first plurality of pixel pairs from the respective differences for the first plurality of pixel pairs, forming the respective differences for a second plurality of pixel pairs, each pixel pair comprising two pixels from scan lines respectively above and below the pixel, each pixel pair for the second plurality of pixel pairs having a second common direction, calculating a second combined difference for the second plurality of pixel pairs from the respective differences for the second plurality of pixel pairs, and comparing the difference between the second combined difference and the first combined difference with an edge threshold to determine whether an edge exists.

Each of the first and second plurality of pixel pairs can include at least three pixel pairs. The calculating of the first and second combined differences can include adding the absolute values of each of the respective differences formed from each of the respective pixel pairs for the first and second plurality of pixel pairs, respectively. The first direction can be along an approximate 135 degree angle from vertical at the pixel and the second direction can be along an approximate 45 degree angle from vertical at the pixel.

The edge direction detection can further include forming the respective differences for a third plurality of pixel pairs, each pixel pair comprising two pixels from scan lines respectively above and below the pixel, each pixel pair for the third plurality of pixel pairs having a third common direction, calculating a third combined difference for the third plurality of pixel pairs from the respective differences for the third plurality of pixel pairs, and if an edge exists, comparing the third combined difference with the first and second combined differences to determine the edge direction. Each of the third plurality of pixel pairs can include at least three pixel pairs. The calculating of the third combined difference can include adding the absolute values of each of the respective differences formed from each of the respective pixel pairs for the third plurality of pixel pairs. The calculating of the third combined difference can further include multiplying the added absolute values with a sensitivity factor. The third direction can be substantially vertical.

The edge adaptive interpolation at the pixel can further include, if the edge direction is substantially vertical, then forming an intermediate pixel value by averaging at least one pixel substantially directly above and at least one pixel substantially directly below the pixel, if the edge direction is approximately 45 degrees from vertical, then forming the intermediate pixel value by averaging at least one pixel above and at least one pixel below the pixel and substantially along a 45 degree axis through the pixel, and if the edge direction is approximately 135 degrees from vertical, then forming the intermediate pixel value by averaging at least one pixel above and at least one pixel below the pixel and substantially along a 135 degree axis through the pixel.

The motion adaptive interpolation at the pixel can be performed by multiplying the intermediate pixel value by the motion value and adding the value of the pixel from the next field multiplied by the difference between a maximum motion value and the motion value to form a final interpolated value for the pixel.

In general, in another aspect, the invention features apparatus for interpolating a pixel during the deinterlacing of a video signal, the video signal including at least two fields of interlaced scan lines, each scan line including a series of pixels having respective intensity values, the apparatus including a motion value generator configured to generate a motion value representative of the motion between successive frames about the pixel, an edge direction detector configured to detect an edge direction about the pixel, an edge adaptive interpolator configured to perform an edge adaptive interpolation at the pixel, using the detected edge direction, and a motion adaptive interpolator configured to perform a motion adaptive interpolation at the pixel, using the generated motion value.

Embodiments of the invention may include one or more of the following features. The motion value generator can compare segments of pixels from successive frames about the pixel to generate the motion value. The segments can include at least two consecutive pixels in a scan line. The motion value generator can further include a difference calculator configured to calculate a plurality of differences for each of a plurality of pixel segments from successive frames about the pixel, a difference comparator configured to determine the greatest of the calculated plurality of differences, and a look-up table of motion value configured to be indexed by the greatest of the calculated plurality of differences from the difference comparator. The motion value generator can further include an edge detector configured to detect whether an edge exists about the pixel, where the look-up table is selected from a plurality of look-up tables depending upon whether an exists. The motion value can be generated by comparing segments of pixels about the pixel from at least three successive frames. A feature buffer can store the pixel segments for at least one of the successive frames.

The edge direction detector can further include a first pixel pair comparator configured to form the respective differences for a first plurality of pixel pairs, each pixel pair comprising two pixels from scan lines respectively above and below the pixel, each pixel pair for the first plurality of pixel pairs having a first common direction, a first pixel pair difference calculator configured to calculate a first combined difference for the first plurality of pixel pairs from the respective differences for the first plurality of pixel pairs, a second pixel pair comparator configured to form the respective differences for a second plurality of pixel pairs, each pixel pair comprising two pixels from scan lines respectively above and below the pixel, each pixel pair for the second plurality of pixel pairs having a second common direction, a second pixel pair difference calculator configured to calculate a second combined difference for the second plurality of pixel pairs from the respective differences for the second plurality of pixel pairs, and an edge existence logic configured to compare the difference between the second combined difference and the first combined difference with an edge threshold to determine whether an edge exists.

Each of the first and second plurality of pixel pairs can include at least three pixel pairs. The calculating of the first and second combined differences can include adding the absolute values of each of the respective differences formed from each of the respective pixel pairs for the first and second plurality of pixel pairs, respectively. The first direction can be along an approximate 135 degree angle from vertical at the pixel and the second direction can be along an approximate 45 degree angle from vertical at the pixel.

The edge direction detector can further include a third pixel pair comparator configured to form the respective differences for a third plurality of pixel pairs, each pixel pair comprising two pixels from scan lines respectively above and below the pixel, each pixel pair for the third plurality of pixel pairs having a third common direction, a third pixel pair difference calculator configured to calculate a third combined difference for the third plurality of pixel pairs from the respective differences for the third plurality of pixel pairs, and an edge direction calculator configured to compare, if an edge exists, the third combined difference with the first and second combined differences to determine the edge direction. The third plurality of pixel pairs can include at least three pixel pairs. The calculating of the third combined difference can include adding the absolute values of each of the respective differences formed from each of the respective pixel pairs for the third plurality of pixel pairs. The calculating of the third combined difference can further include multiplying the added absolute values with a sensitivity factor. The third direction can be substantially vertical.

The edge adaptive interpolator can further include logic configured to, if the edge direction is substantially vertical, form an intermediate pixel value by averaging at least one pixel substantially directly above and at least one pixel substantially directly below the pixel, if the edge direction is approximately 45 degrees from vertical, form the intermediate pixel value by averaging at least one pixel above and at least one pixel below the pixel and substantially along a 45 degree axis through the pixel, and if the edge direction is approximately 135 degrees from vertical, form the intermediate pixel value by averaging at least one pixel above and at least one pixel below the pixel and substantially along a 135 degree axis through the pixel.

The motion adaptive interpolator can include logic to multiply the intermediate pixel value by the motion value and to add the value of the pixel from the next field multiplied by the difference between a maximum motion value and the motion value to form a final interpolated value for the pixel.

Advantages of the invention may include one or more of the following. By smoothly combining both intra-field and inter-field values for each pixel in a frame, weighted by the detected motion at the pixel, the invention can provide for greater accuracy in deinterlacing scanned video signals and greater fidelity in the displayed image, for both static and dynamic portions of scene. Use of inter-field interpolation techniques for pixels having lower motion values allows for higher vertical resolution. Use of intra-field interpolation for pixels with higher motion values reduces unwanted motion effects. Combining both in a linear function, weighted by the detected motion at the pixel, can smoothly provide the best of both techniques. By selecting a motion value look-up table based upon whether an edge is detected at the pixel allows for more accurate motion value determinations. Determining motion values based upon segments of pixels also can increase motion detection accuracy and reduce noise and false motion determinations. Further, since each pixel in a segment will share a common motion value, segmentation sharply reduces the number of motion calculations required per frame. Use of at least three frames of segmented pixel information allows for more accurate motion determinations. Use of segmentation and feature buffers for storing segments of prior frames can reduce the bandwidth required to perform feature buffer reads and writes. It can also eliminate the need to perform segmentation calculations more than once per frame. Interpolating a pixel value along a detected edge provides further accuracy in deinterlacing a video signal.

These and other features and advantages of the present invention will become more apparent from the following description, drawings, and claims.

DRAWINGS

DESCRIPTION

Figure 1:
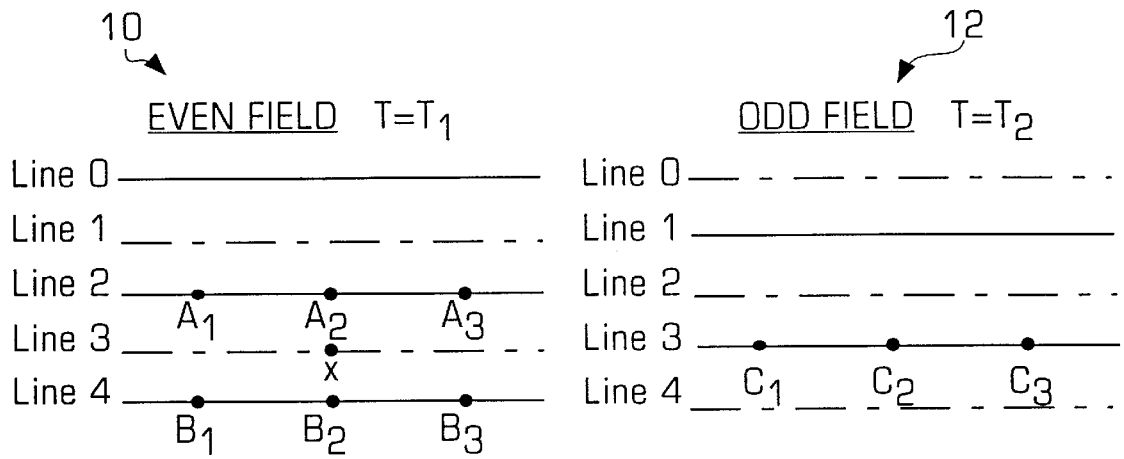
FIG. 1 is a diagram of even and odd fields in an interlaced scanned video source.

FIG. 1 shows diagrams of an even field 10 and an odd field 12 of a typical interlaced scanned video source. Even field 10 consists of even scanning lines 0, 2, and 4, etc. while odd field 12 consists of odd scanning lines 1, 3, etc. A typical NTSC television video source consists of 525 lines divided in this manner. Even field 10 is scanned at time $t=t_1$ while odd filed 12 is scanned at later time $t=t_2$. To construct a complete frame from, e.g., the even field 10, each missing line (e.g., line 3) must be reconstructed. Solid lines in FIG. 1 represent existing scanned lines in a given field, while dashed lines depict missing lines that require reconstruction.

As an example, each pixel element X along line 3 of even field 10 must be reconstructed. One can simply use pixel elements $C_1$, $C_2$, and $C_3$, etc. from the next odd field 12, but such a simple inter-field technique can introduce motion effects as described. Or one can simply interpolate the missing elements $C_1$, $C_2$, and $C_3$ using the intra-field neighboring pixel values $A_1$, $A_2$, $A_3$ and B, $B_2$, $B_3$, etc. But such intra-field techniques do not provide high vertical resolution and can produce jagged aliasing artifacts along diagonal edges.

Figure 2:
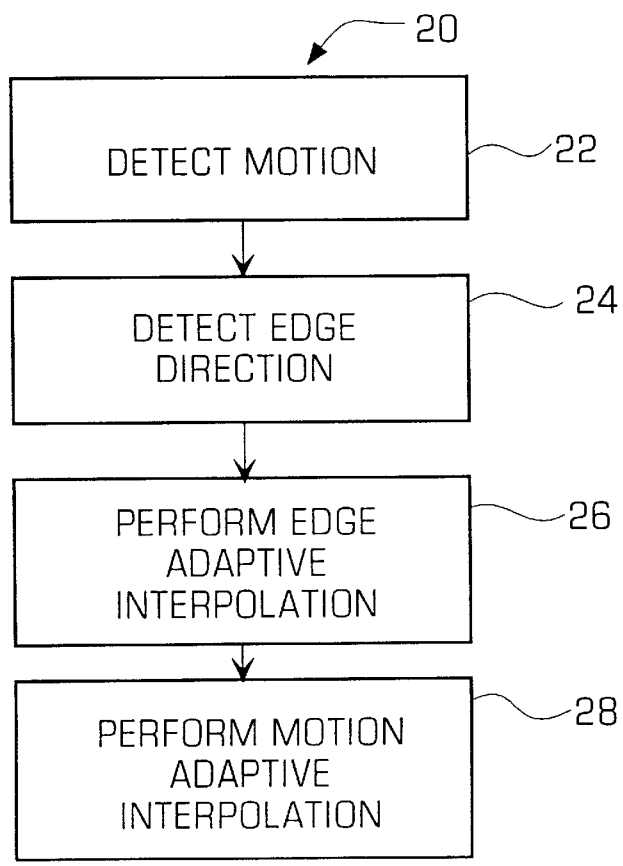
FIG. 2 is a flow chart of a motion and edge adaptive deinterlacing method.

FIG. 2 shows a flow chart of a powerful, general purpose deinterlacing method 20 that improves vertical resolution for areas of a frame that have less motion and reduces unwanted motion effects in other areas that have greater motion. First, for each pixel X a motion value is detected using the information from a succession of frames (step 22). In a preferred embodiment, the motion value is a 4 bit integer having values 0 through 15 proportional to the motion level of the scene around pixel X. Second, an edge direction is generated for pixel X using the intensity values of neighboring pixels around pixel X within its own frame (step 24).

In one embodiment, the edge direction can be defined as generally 45 degrees, 135 degrees, or no edge (also 90 degrees). Third, an intermediate interpolated value for the pixel is determined by using the edge direction data and certain neighboring pixel values around pixel X (step 26). Fourth, a final pixel value for pixel X is defined by a linear combination of the intermediate interpolated value and the value for pixel X from the next field, each component weighted by the detected motion value (step 28).

Figure 3:
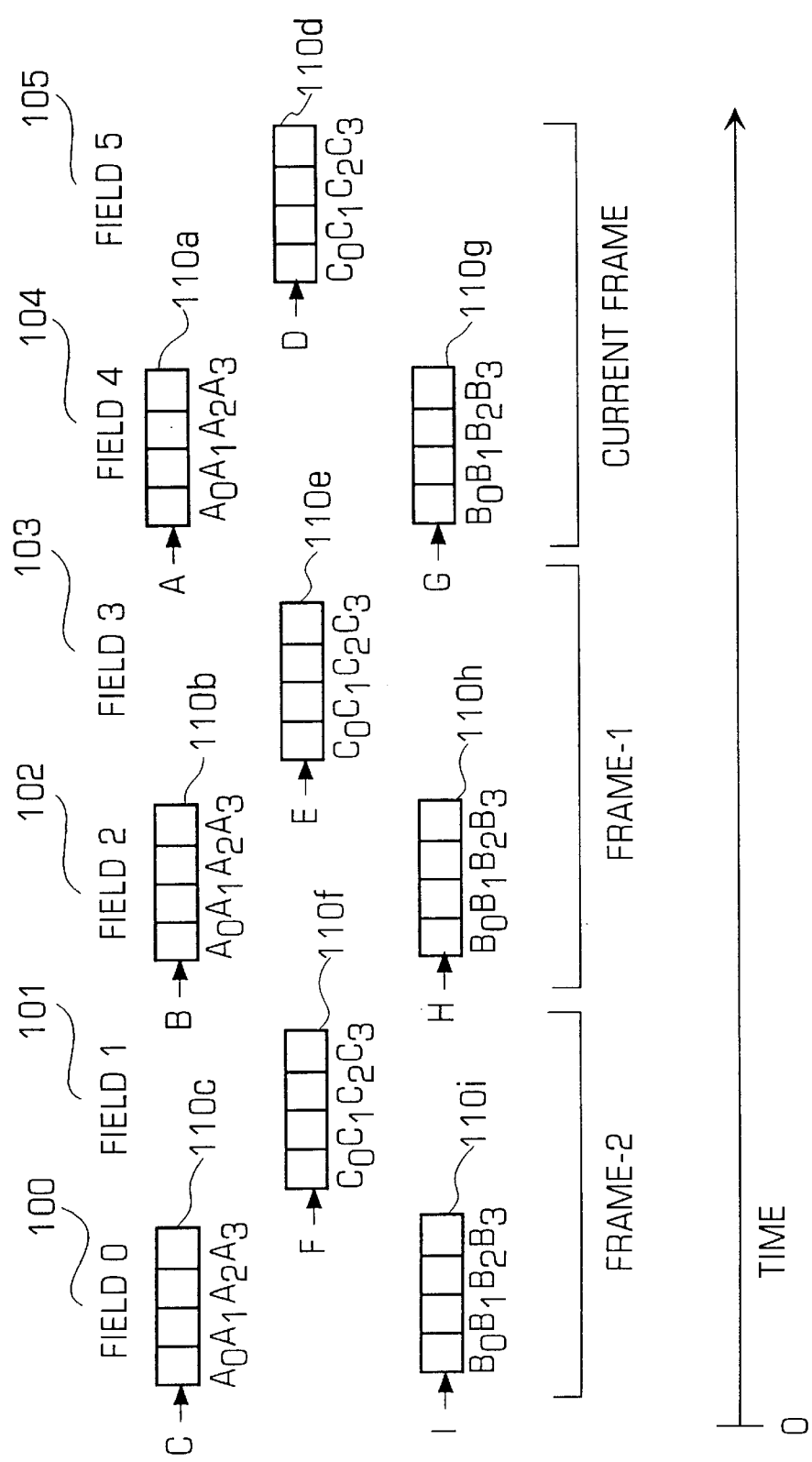
FIG. 3 is a time diagram of inter-field pixel segments used in a motion detection method.
Figure 4:
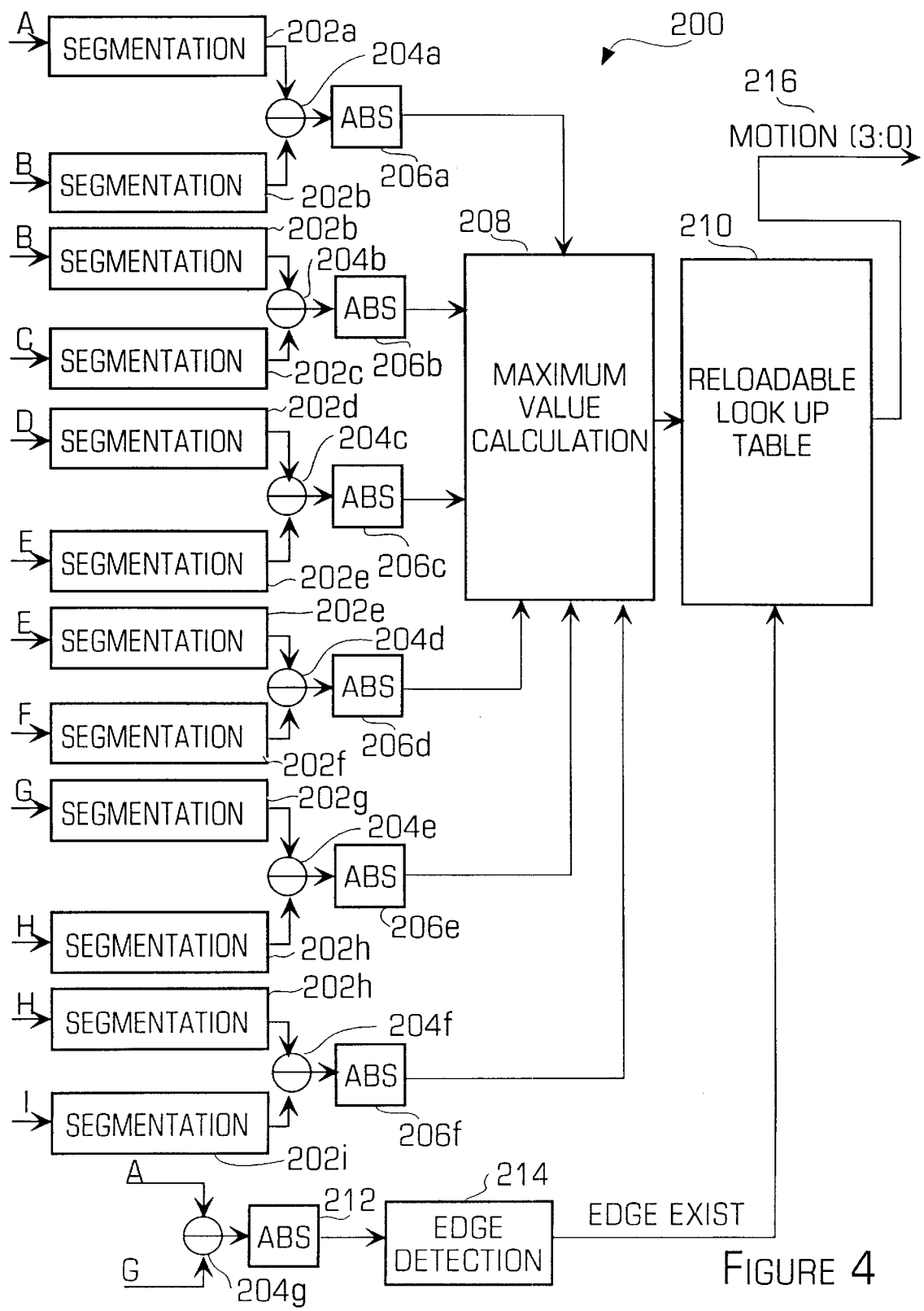
FIG. 4 is a schematic diagram of apparatus for detecting a motion value.

Referring to FIGS. 3 and 4, the motion value for a pixel X is generated by analyzing groups of pixels around pixel X for a succession of fields. In one embodiment, six fields are consulted: field 0 (item 100) and field 1 (item 101) are two frames prior to the current frame, field 2 (item 102) and field 3 (item 103) are one frame prior to the current frame, and field 4 (104) and field 5 (105) comprise the current frame. In addition, segments of pixels (110a through 110i) from these fields, rather than individual pixels, are compared to detect the motion value. In one embodiment, each segment 110 comprises four contiguous pixels in a scanning line, averaged into one intensity value. Any number of pixels greater than one can be segmented in this manner.

Each segment used in the motion value calculation for pixel X is generally either adjacent to or contains pixel X. For example, segment A (110a) from field 4 of the current frame is a segment of pixels above pixel X, while segment G (110g) from the same field is a segment of pixels below pixel X. And segment D (110d) is from the next field 5 of the same frame, and contains pixel X.

Segmenting pixels together for performing motion detection has several advantages. First, it reduces noise and increases motion detection accuracy. Second, each of the pixels (e.g., four) within a segment will share the same motion value, so that motion calculations need be done only, e.g., once every four pixels. And third, as described further below, since motion calculations require comparing several frames of segment information, segmentation allows storage of prior field information in a more compact form, e.g., in feature buffers.

Referring to FIG. 4, the motion value detection method 200 is shown schematically. The motion value detection method can be implemented in any convenient manner, e.g., in software on a general purpose computer, or in dedicated hardware. In a preferred embodiment, after segmenting each required block of pixels (logical blocks 202a through 202i) the differences between respective pairs of segments of pixels adjacent (or containing) pixel X from successive fields are determined. For example, segment A (110a) from current even field 4 is subtracted (block 204a) from segment B (110b) of prior even field 2, and the absolute value of the result (block 206a) is determined. Similarly, the absolute value (block 206b) of the difference (block 204b) of segment B (110b) of prior even field 2 and segment C (110c) of earlier even field 0 is determined. In likewise fashion, segment E (110e) is subtracted from segment D (110d), segment F (110f) is subtracted from segment E (110e), segment H (110h) is subtracted from segment G (110g), and segment I (110i) is subtracted from segment H (110h) (blocks 202c through 202f). The absolute value of each of these differences is determined next (blocks 206c through 206f). Then the maximum of these absolute difference values is determined (block 208). The resulting maximum difference value (Max Intersegment Difference) is then used as an index to a reloadable look-up table of motion values (block 210) to output a final motion value 216. In one embodiment, each pixel (and each averaged pixel segment) has 8 bit intensity values (that is, from 0 to 255) and the motion value 216 is a 4 bit number having values from 0 to 15.

In one embodiment, a different look-up table can be loaded depending upon whether an edge is detected around pixel X or not. For example, the difference between segments A (110*a*) and G (110*g*) of the current even field 4 can be determined (block 204*g*), and the absolute value of the result compared against an edge threshold value in an edge detection step (block 214) to determine if there is a sharp difference from above and below pixel X. This determines whether there is an intra-field vertical edge at pixel X.

If no edge is detected, the look-up table can be a simple function:

Motion[3:0]=Max Intersegment Difference, if less than or equal to 15; and

Motion[3:0]=15 for all other values of Max Intersegment Difference.

If an edge (e.g., an intra-field vertical edge) is detected, the effective motion value can be reduced, for example:

Motion[3:0]=½ Max Intersegment Difference, if less than or equal to 31; and

Motion[3:0]=15 for all other values of Max Intersegment Difference.

Using a different look-up table (having reduced motion values) when an edge is detected can generate a more accurate interpolation result. As made clearer with respect to the interpolation calculations described below, if an edge is detected, and a reduced motion value is retrieved from the alternative look-up table, the deinterlacing calculation will generate the intensity of pixel X by taking more of its value from the next field and using less interpolation from the existing pixels surrounding pixel X in its current field, which might otherwise "soften" the edge and produce, in general, a less accurate result.

A variety of look-up tables for motion values can be used depending upon implementation. For example, the motion value can be a full 8 bit number, fully mapping to the scale of maximum intensity differences generated between successive pixel segments. Also, more elaborate edge detection algorithms (as described further below) can be used to select from different look-up tables depending upon edge direction.

Figure 5A:
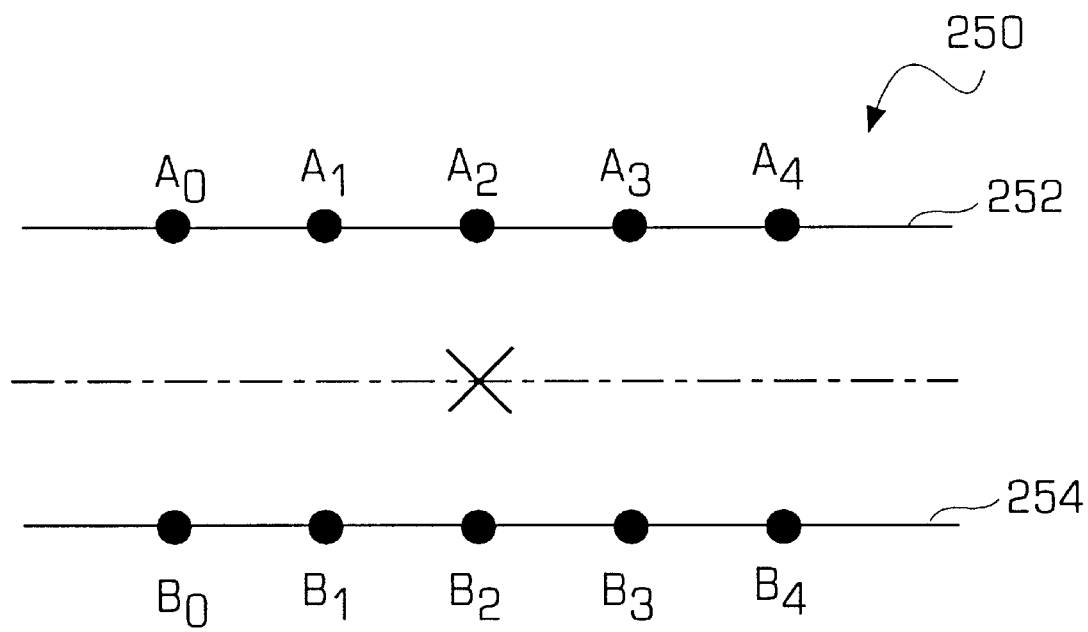
FIGS. 5a through 5d are pixel diagrams illustrating an edge detection method.
Figure 5B:
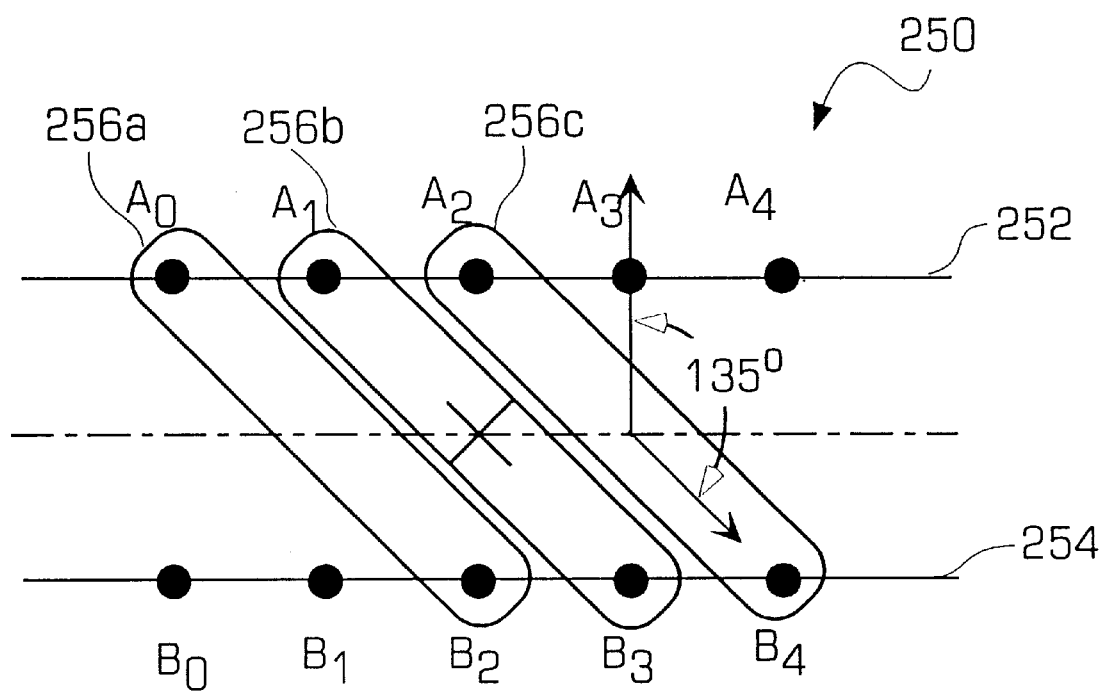

After the motion value is generated (step 22 of FIG. 2), the direction of an edge adjacent pixel X (if any) is determined (step 24 of FIG. 2). Referring to FIGS. 5*a* through 5*d*, edge detection is performed on groups of pixels 250 above and below pixel X. As shown in FIG. 5*a*, scan line 252 above pixel X includes five pixels $A_0$ through $A_5$ and scan line 254 below pixel X includes five pixels $B_0$ through $B_5$. Referring to FIG. 5*b*, the edge detection algorithm first computes the respective differences between three pairs of pixels about pixel X (256*a*, 256*b*, and 256*c*), along a 135 degree axis (as measured from vertical), each pair comprising one pixel from scan line 252 and one from scan line 254. The absolute values of these respective differences are then summed to yield a Diff135 value:

$$\text{Diff135}=|A_0-B_2|+|A_1-B_3|+|A_2-B_4|$$

Figure 5C:
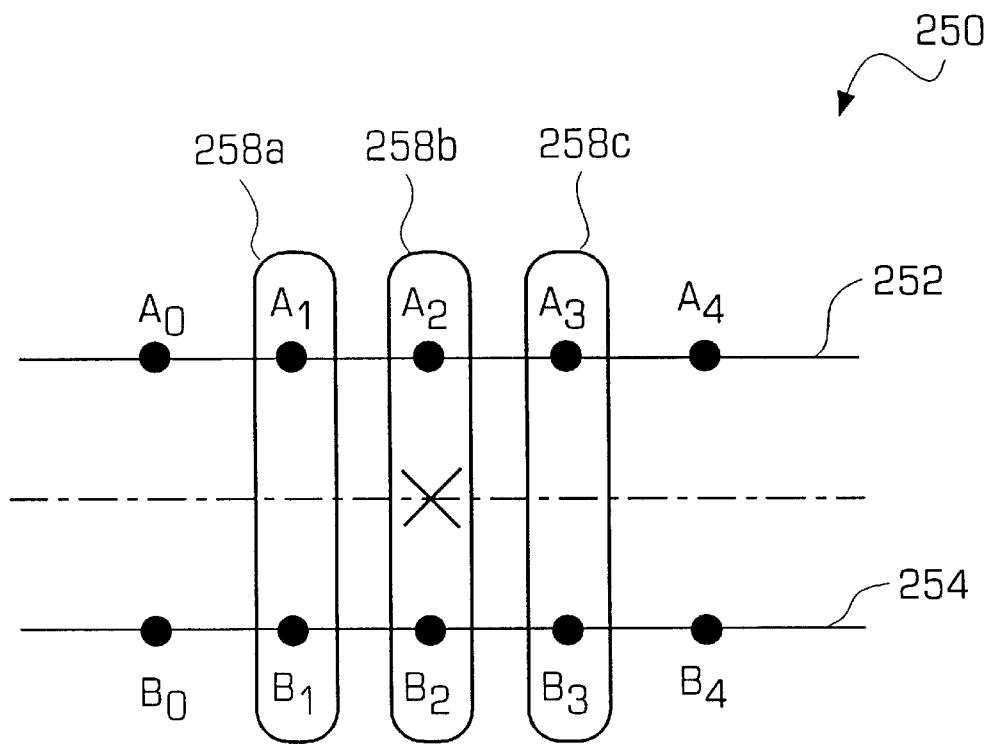

Similarly, referring to FIG. 5*c*, the edge detection algorithm next computes the respective differences between three pairs of pixels about pixel X (258*a*, 258*b*, and 258*c*), along a 90 degree (or vertical) axis. The absolute values of these respective differences are then summed to yield a Diff90 value:

$$\text{Diff90}=|A_1-B_1|+|A_2-B_2|+|A_3-B_3|\cdot\text{Factor}$$

where Factor is a sensitivity constant that reduces the sensitivity of the Diff90 calculation. In one embodiment, Factor=0.75.

Figure 5D:
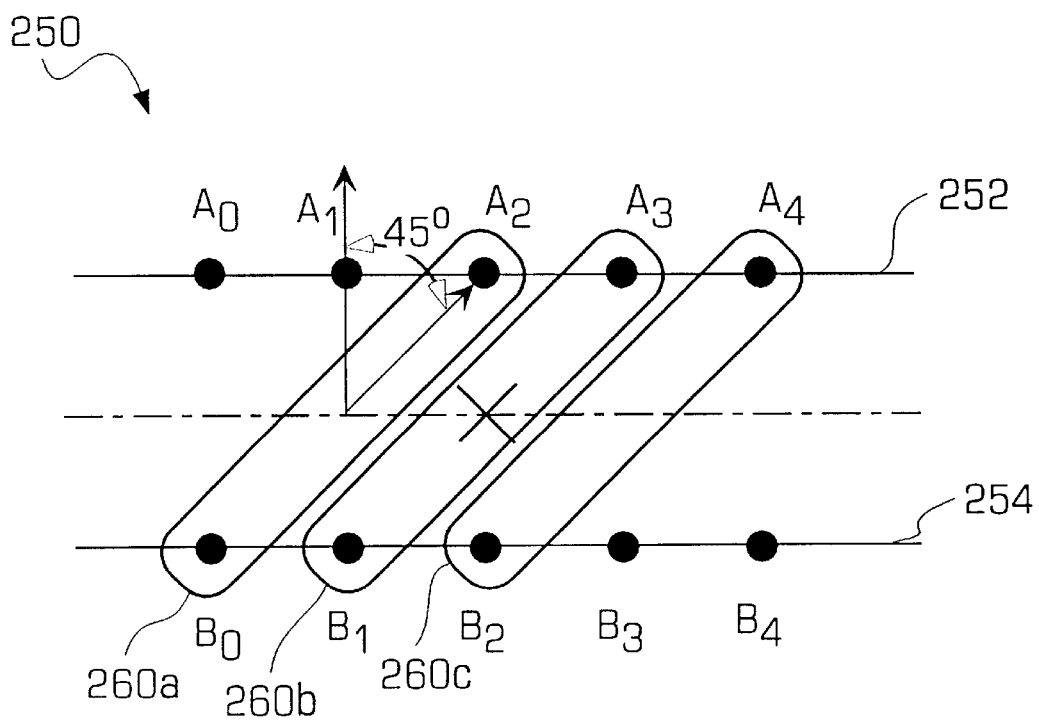

And, referring to FIG. 5*d*, the edge detection algorithm next computes the respective differences between three pairs of pixels about pixel X (260*a*, 260*b*, and 260*c*), along a 45 degree axis. The absolute values of these respective differences are then summed to yield a Diff45 value:

$$\text{Diff45}=|A_2-B_0|+|A_3+B_1|+|A_4-B_2|$$

These three comparisons of pixel pairs along three different directions about pixel X (the pixel to be interpolated) are then compared to determine the existence and direction of an edge about pixel X.

First, Diff45 and Diff135 are compared against an edge threshold to determine if a substantially non-vertical edge exists:

IF |Diff45−Diff135|>Edge_Threshold THEN Edge_Exist where Edge_Threshold is another sensitivity factor for deciding edge existence. In one embodiment, Edge_Threshold=32. Both Edge Threshold and Factor can be adjusted to account for scenes with a higher level of detail that might generate false edge indications. In particular, edge calculations should generally not determine that small details such as thin lines are edges. The sensitivity constant Factor can account for instances where, e.g., a single thin line would generate a high 90 degree difference across pixel sets, but low 45 degree and 135 differences, thereby possibly generating a false edge.

The default condition for the edge detection algorithm is no edge (or a 90 degree edge). The edge detection algorithm uses the Diff45, Diff90, and Diff135 results to determine the direction of an existing edge:

IF ((Diff45<=Diff90) AND (Diff45<=Diff135) AND Edge_Exist)
   THEN Edge[1:0]=10;
ELSE
IF ((Diff135<=Diff90) AND (Diff135<=Diff45) AND Edge_Exist)
   THEN Edge[1:0]=11;
ELSE Edge[1:0]=00.

where Edge[1:0] is a two bit binary code for edge conditions: Edge[1:0]=00 in binary indicates no (or a vertical) edge, Edge[1:0]=10 indicates an edge substantially along the 45 degree axis; and Edge[1:0]=11 indicates an edge substantially along the 135 degree axis. Any other convention for defining Edge can be used as well.

Figure 6:
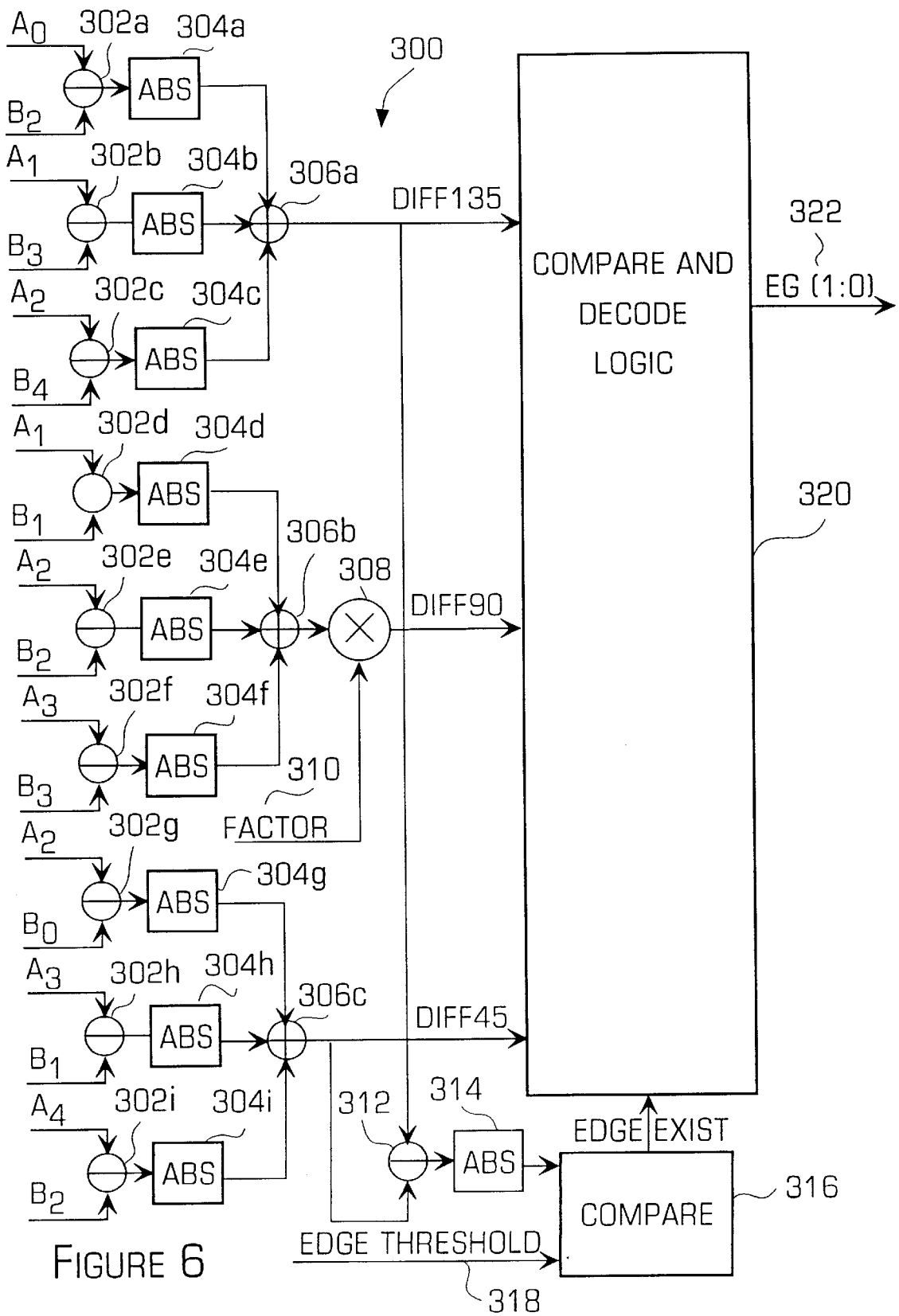
FIG. 6 is a schematic diagram of apparatus for detecting edges.

FIG. 6 represents a schematic diagram 300 for implementing the edge detection algorithm. Diff135 is calculated first by calculating the respective differences of three pixel pairs ($A_0-B_2$, $A_1-B_3$, $A_2-B_4$) (in logical blocks 302*a* through 302*c*), taking the absolute value of those differences (blocks 304*a* through 304*c*), and then summing the results (block 306*a*). Diff90 is calculated by calculating the respective differences of three other pixel pairs ($A_1-B_1$, $A_2-B_2$, $A_3-B_3$) (in blocks 302*d* through 302*f*), taking the absolute value of those differences (blocks 304*d* through 304*f*), summing the results (block 306*b*), and then multiplying by Factor 310 (block 308). And Diff45 is calculated first by calculating the respective differences of three other pixel pairs ($A_2-B_0$, $A_3-B_1$, $A_4-B_2$) (in blocks 302*g* through 302*i*), taking the absolute value of those differences (blocks 304*g* through 304*i*), and then summing the results (block 306*c*).

The difference between Diff135 and Diff45 is then determined (block 312), and the absolute value of the result (block 314) is compared with an edge threshold 318 to determine whether Edge Exist is TRUE (block 316). Then Diff90, Diff135, Diff45, and the Edge_Exist signal are provided to compare and decode logic 320 which performs the comparisons described above to produce a final Edge [1:0] signal 322.

After Edge[1:0] and Motion[3:0] have been determined (which can be accomplished in any order or in parallel), an intermediate intra-field interpolation result M_Data for pixel X is calculated (step 26 of FIG. 2) as follows:

IF Edge[1:0]=00 (a 90 degree or no edge),
   THEN M_Data=$A_2/2+B_2/2$;
IF Edge[1:0]=10 (a 45 degree edge),
   THEN M_Data=$A_3/2+B_1/2$; and
IF Edge[1:0]=11 (a 135 degree edge),
   THEN M_Data=$A_1/2+B_3/2$;

These calculations interpolate the value for pixel X based upon the values along the detected edge, providing for more accurate edge depiction.

Finally, the intra-field interpolation result is mixed with the value $C_2$ for pixel X obtained from the next field (e.g., odd field 12 in FIG. 1):

IF (Motion=15) THEN X=M_Data;
Else X=((16−Motion[3:0])·C+(Motion·M_Data))/16.

Since Motion is a 0 to 15 valued integer, if Motion is high, most of pixel X is determined by the intra-field result M_Data. If Motion is very low, all of the value of pixel X is determined from its value C in the next field.

By smoothly combining both intra-field and inter-field values for each pixel in a frame, weighted by the detected motion at the pixel, the present methods provide for greater accuracy in deinterlacing scanned video signals and greater fidelity in the displayed image, for both static and dynamic portions of scene.

Figure 7:
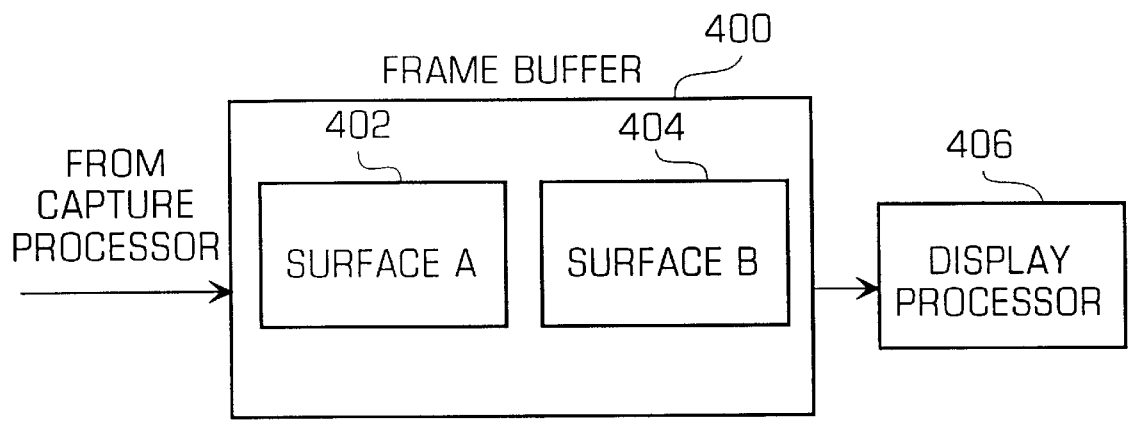
FIG. 7 is a prior art frame buffer for frame displays.

In addition to the logical hardware shown in FIGS. 4 and 6, it can be useful to provide for memory storage of prior frame information for performing motion calculations. As shown in FIG. 7, for a number of video applications (for example, in typical PC graphics processors and video cards) a frame buffer 400 comprises two buffers (here termed Surface A 402 and Surface B 404) that hold sequential video frames. One buffer is written to by a capture processor or the like, while the other buffer is read out to the display processor 406 for display upon the video screen. This ensures that the memory being read out is not tampered with by memory writes for the next frame. Double buffers are especially useful in implementations where the input vertical synchronization is different from the output vertical synch signal. In typical double buffering, though, the display processor has no access to the prior frame of information.

Figure 8:
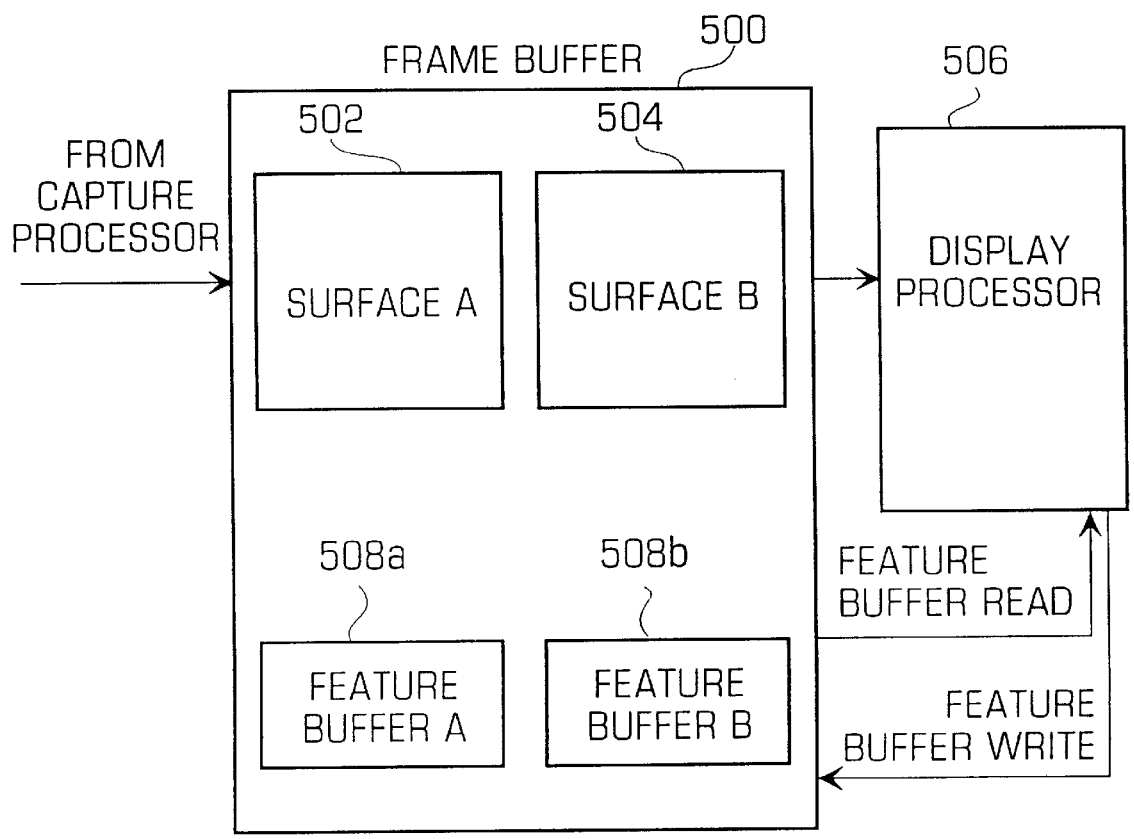
FIG. 8 is a frame buffer providing feature buffers for real-time motion and edge adaptive deinterlacing.

As shown in FIG. 8, to enable motion detection for several prior frames of pixel information, one embodiment of the present invention employs two feature buffers, feature buffer A 508a and feature buffer B 508b. For each frame that is displayed, display processor 506 extracts pertinent features of the current frame and writes it back to frame buffer 500, storing it in one of the feature buffers 508a or 508b. In this manner, the two feature buffers will store two prior frame's worth of pertinent feature information that can be used by the motion detector during motion calculations to generate motion values for each pixel of a current frame.

As described above, during motion detection the present invention uses segmentation to average four contiguous pixels into one averaged pixel segment. These segments are then compared, as described above. One convenient result of segmentation is that only the calculated pixel segments for a current frame need be stored in the feature buffers 508a and 508b. This reduces the bandwidth required to perform feature buffer reads and writes. It also eliminates the need to perform segmentation calculations more than once per frame. As described above, determining motion values based upon segments of pixels also can increase motion detection accuracy and reduce noise and false motion determinations. Further, since each pixel in a segment will share a common motion value, segmentation sharply reduces the number of motion calculations required per frame. As noted above, each segment can have any number of pixels: four was selected here for one embodiment of the invention.

Other embodiments are within the scope of the claims. For example, any of the logical blocks can be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the present invention. Or, the modules can comprise programming instructions transmitted to a general purpose computer or to graphics processing hardware via a transmission carrier wave. Also, the modules can be implemented as hardware logic circuitry implementing the functions encompassed by the present invention. Any number of pixels can be combined into segments used for the motion detection calculations. Any number of prior frames can be used to detect motion at a pixel location. Any number of pixel pairs can be used for edge detection. Other edge directions can be determined by using different selections of pixel pairs. Different groups of pixels can be selected to determine edge directions and/or interpolate values. Different motion factors and edge thresholds can be selected to adjust the sensitivity of the calculations. The deinterlacing methods and apparatus can be used for both digital and analog video signals, in particular for noninterlaced television applications.

What is claimed:

1. A method for interpolating a pixel during the deinterlacing of a video signal, the video signal including at least two fields of interlaced scan lines, each scan line including a series of pixels having respective intensity values, the method comprising:

generating a motion value representative of the motion between successive frames about the pixel, wherein the motion value is generated by, for each of a plurality of pixel segments from successive frames about the pixel, calculating a plurality of differences,
   determining the greatest of the calculated plurality of differences, and
   determining the motion value from a look-up table using the greatest of the calculated plurality of differences, where the look-up table is selected from a plurality of look-up tables depending upon whether an edge exists about the pixel;

detecting an edge direction about the pixel, by:
   forming the respective differences for a first plurality of pixel pairs, each pixel pair comprising two pixels from scan lines respectively above and below the pixel, each pixel pair for the first plurality of pixel pairs having a first common direction,
   calculating a first combined difference for the first plurality of pixel pairs from the respective differences for the first plurality of pixel pairs;
   forming the respective differences for a second plurality of pixel pairs, each pixel pair comprising two pixels from scan lines respectively above and below the pixel, each pixel pair for the second plurality of pixel pairs having a second common direction, calculating a second combined difference for the second plurality of pixel pairs from the respective differences for the second plurality of pixel pairs, comparing the difference between the second combined difference and the first combined difference with an edge threshold to determine whether an edge exists, forming the respective differences for a third plurality of pixel pairs, each pixel pair comprising two pixels from scan lines respectively above and below the pixel, each pixel pair for the third plurality of pixel pairs having a third common direction, calculating a third combined difference for the third plurality of pixel pairs from the respective differences for the third plurality of pixel pairs, and if an edge exists, comparing the third combined difference with the first and second combined differences to determine the edge direction;

performing an edge adaptive interpolation at the pixel, using the detected edge direction, by:

if the edge direction is substantially vertical, then forming an intermediate pixel value by averaging at least one pixel substantially directly above and at least one pixel substantially directly below the pixel, if the edge direction is approximately 45 degrees from vertical, then forming the intermediate pixel value by averaging at least one pixel above and at least one pixel below the pixel and substantially along a 45 degree axis through the pixel, and if the edge direction is approximately 135 degrees from vertical, then forming the intermediate pixel value by averaging at least one pixel above and at least one pixel below the pixel and substantially along a 135 degree axis through the pixel; and performing a motion adaptive interpolation at the pixel, using the generated motion value, by multiplying the intermediate pixel value by the motion value and adding the value of the pixel from the next field multiplied by the difference between a maximum motion value and the motion value to form a final interpolated value for the pixel.

2. Apparatus for interpolating a pixel during the deinterlacing of a video signal, the video signal including at least two fields of interlaced scan lines, each scan line including a series of pixels having respective intensity values, the apparatus comprising:

a motion value generator, wherein the motion value generator compares segments of pixels from successive frames about the pixel to generate the motion value, the motion value generator further comprising:

a difference calculator configured to calculate a plurality of differences for each of a plurality of pixel segments from successive frames about the pixel, a difference comparator configured to determine the greatest of the calculated plurality of differences, an edge detector configured to detect whether an edge exists about the pixel, and a plurality of look-up tables indexed by the greatest of the calculated plurality of differences from the difference comparator and selectable depending upon whether an edge exists;

an edge direction detector configured to detect an edge direction about the pixel; the edge direction detector further comprising:

a first pixel pair comparator configured to form the respective differences for a first plurality of pixel pairs, each pixel pair comprising two pixels from scan lines respectively above and below the pixel, each pixel pair for the first plurality of pixel pairs having a first common direction, a first pixel pair difference calculator configured to calculate a first combined difference for the first plurality of pixel pairs from the respective differences for the first plurality of pixel pairs, a second pixel pair comparator configured to form the respective differences for a second plurality of pixel pairs, each pixel pair comprising two pixels from scan lines respectively above and below the pixel, each pixel pair for the second plurality of pixel pairs having a second common direction, a second pixel pair difference calculator configured to calculate a second combined difference for the second plurality of pixel pairs from the respective differences for the second plurality of pixel pairs, an edge existence logic configured to compare the difference between the second combined difference and the first combined difference with an edge threshold to determine whether an edge exists, a third pixel pair comparator configured to form the respective differences for a third plurality of pixel pairs, each pixel pair comprising two pixels from scan lines respectively above and below the pixel, each pixel pair for the third plurality of pixel pairs having a third common direction, a third pixel pair difference calculator configured to calculate a third combined difference for the third plurality of pixel pairs from the respective differences for the third plurality of pixel pairs, and an edge direction calculator configured to compare, if an edge exists, the third combined difference with the first and second combined differences to determine the edge direction;

an edge adaptive interpolator configured to perform an edge adaptive interpolation at the pixel, using the detected edge direction, the edge adaptive interpolator further comprising:

logic configured to: if the edge direction is substantially vertical, form an intermediate pixel value by averaging at least one pixel substantially directly above and at least one pixel substantially directly below the pixel; if the edge direction is approximately 45 degrees from vertical, form the intermediate pixel value by averaging at least one pixel above and at least one pixel below the pixel and substantially along a 45 degree axis through the pixel; and if the edge direction is approximately 135 degrees from vertical, form the intermediate pixel value by averaging at least one pixel above and at least one pixel below the pixel and substantially along a 135 degree axis through the pixel; and a motion adaptive interpolator configured to perform a motion adaptive interpolation at the pixel, using the generated motion value, wherein the motion adaptive interpolator includes logic to multiply the intermediate pixel value by the motion value and to add the value of the pixel from the next field multiplied by the difference between a maximum motion value and the motion value to form a final interpolated value for the pixel.

3. A method for interpolating a pixel during the deinterlacing of a video signal, the video signal including at least two fields of interlaced scan lines, each scan line including a series of pixels having respective intensity values, comprising the steps of:

generating a motion value representative of the motion between successive frames about the pixel by segmenting an image into a plurality of multi-pixel segments and comparing the differences with respect to each segment in successive frames;

detecting an edge direction about the pixel;

performing an edge adaptive interpolation at the pixel using the detected edge direction; and performing a motion adaptive interpolation at the pixel using the generated motion value;

wherein the step of generating the motion value further comprises:

for each of a plurality of pixel segments from successive frames about the pixel, calculating a plurality of differences;

determining the greatest of the calculated plurality of differences; and determining the motion value from a look-up table using the greatest of the calculated plurality of differences.

4. The method of claim 3 further comprising the step of detecting whether an edge exists about the pixel and selecting the look-up table from a plurality of look-up tables depending upon whether an edge exists.

5. A method for interpolating a pixel during the deinterlacing of a video signal, the video signal including at least two fields of interlaced scan lines, each scan line including a series of pixels having respective intensity values, comprising the steps of:

generating a motion value representative of the motion between successive frames about the pixel by segmenting an image into a plurality of multi-pixel segments and comparing the differences with respect to each segment in successive frames;

detecting an edge direction about the pixel;

performing an edge adaptive interpolation at the pixel using the detected edge direction; and performing a motion adaptive interpolation at the pixel using the generated motion value;

wherein the motion value is generated by comparing segments of pixels about the pixel from at least three successive frames.

6. A method for interpolating a pixel during the deinterlacing of a video signal, the video signal including at least two fields of interlaced scan lines, each scan line including a series of pixels having respective intensity values, comprising the steps of:

generating a motion value representative of the motion between successive frames about the pixel;

detecting an edge direction about the pixel;

performing an edge adaptive interpolation at the pixel using the detected edge direction; and performing a motion adaptive interpolation at the pixel using the generated motion value;

wherein the step of detecting an edge direction about the pixel comprises:

forming the respective differences for a first plurality of pixel pairs, each pixel pair comprising two pixels from scan lines respectively above and below the pixel, each pixel pair for the first plurality of pixel pairs having a first common direction;

calculating a first combined difference for the first plurality of pixel pairs from the respective differences for the first plurality of pixel pairs;

forming the respective differences for a second plurality of pixel pairs, each pixel pair comprising two pixels from scan lines respectively above and below the pixel, each pixel pair for the second plurality of pixel pairs having a second common direction;

calculating a second combined difference for the second plurality of pixel pairs from the respective differences for the second plurality of pixel pairs; and comparing the difference between the second combined difference and the first combined difference with an edge threshold to determine whether an edge exists; and wherein the calculating of the first and second combined differences comprises adding the absolute values of each of the respective differences formed from each of the respective pixel pairs for the first and second plurality of pixel pairs, respectively.

7. A method for interpolating a pixel during the deinterlacing of a video signal, the video signal including at least two fields of interlaced scan lines, each scan line including a series of pixels having respective intensity values, comprising the steps of:

generating a motion value representative of the motion between successive frames about the pixel;

detecting an edge direction about the pixel;

performing an edge adaptive interpolation at the pixel using the detected edge direction; and performing a motion adaptive interpolation at the pixel using the generated motion value;

wherein the step of detecting an edge direction about the pixel comprises:

forming the respective differences for a first plurality of pixel pairs, each pixel pair comprising two pixels from scan lines respectively above and below the pixel, each pixel pair for the first plurality of pixel pairs having a first common direction;

calculating a first combined difference for the first plurality of pixel pairs from the respective differences for the first plurality of pixel pairs;

forming the respective differences for a second plurality of pixel pairs, each pixel pair comprising two pixels from scan lines respectively above and below the pixel, each pixel pair for the second plurality of pixel pairs having a second common direction;

calculating a second combined difference for the second plurality of pixel pairs from the respective differences for the second plurality of pixel pairs;

comparing the difference between the second combined difference and the first combined difference with an edge threshold to determine whether an edge exists;

forming the respective differences for a third plurality of pixel pairs, each pixel pair comprising two pixels from scan lines respectively above and below the pixel, each pixel pair for the third plurality of pixel pairs having a third common direction;

calculating a third combined difference for the third plurality of pixel pairs from the respective differences for the third plurality of pixel pairs; and if an edge exists, comparing the third combined difference with the first and second combined differences to determine the edge direction.

8. The method of claim 7 wherein each of the third plurality of pixel pairs comprise at least three pixel pairs.

9. The method of claim 7 wherein the step of calculating of the third combined difference comprises adding the absolute values of each of the respective differences formed from each of the respective pixel pairs for the third plurality of pixel pairs.

10. The method of claim 9 wherein the step of calculating the third combined difference further comprises multiplying the added absolute values with a sensitivity factor.

11. The method of claim 7 wherein the third direction is substantially vertical.

12. An apparatus for interpolating a pixel during the deinterlacing of a video signal, the video signal including at least two fields of interlaced scan lines, each scan line including a series of pixels having respective intensity values, comprising:
- a motion value generator configured to generate a motion value representative of the motion between successive frames about the pixel by segmenting an image into a plurality of multi-pixel segments and comparing the differences with respect to each segment in successive frames;
- an edge direction detector configured to detect an edge direction about the pixel;
- an edge adaptive interpolator configured to perform an edge adaptive interpolation at the pixel using the detected edge direction;
- a motion adaptive interpolator configured to perform a motion adaptive interpolation at the pixel using the generated motion value;
- a difference calculator configured to calculate a plurality of differences for each of a plurality of pixel segments from successive frames about the pixel;
- a difference comparator configured to determine the greatest of the calculated plurality of differences; and
- a look-up table of motion value configured to be indexed by the greatest of the calculated plurality of differences from the difference comparator.

13. The apparatus of claim 12 wherein the motion value generator further comprises an edge detector configured to detect whether an edge exists about the pixel, where the look-up table is selected from a plurality of look-up tables depending upon whether an edge exists.

14. The apparatus of claim 12 wherein the motion value is generated by comparing segments of pixels about the pixel from at least three successive frames.

15. The apparatus of claim 12 further comprising a memory that stores the pixel segments for at least one of the successive frames in a reduced size.

16. The apparatus of claim 14 wherein each of the first and second plurality of pixel pairs comprise at least three pixel pairs to calculate a correlation signal for each direction.

17. The apparatus of claim 14 wherein the calculating of the first and second combined differences comprises adding the absolute values of each of the respective differences formed from each of the respective pixel pairs for the first and second plurality of pixel pairs, respectively.

18. An apparatus for interpolating a pixel during the deinterlacing of a video signal, the video signal including at least two fields of interlaced scan lines, each scan line including a series of pixels having respective intensity values, the apparatus comprising:
- a motion value generator configured to generate a motion value representative of the motion between successive frames about the pixel;
- an edge direction detector configured to detect an edge direction about the pixel;
- an edge adaptive interpolator configured to perform an edge adaptive interpolation at the pixel using the detected edge direction; and
- a motion adaptive interpolator configured to perform a motion adaptive interpolation at the pixel using the generated motion value;

wherein the edge direction detector further comprises:
- a first pixel pair comparator configured to form the respective differences for a first plurality of pixel pairs, each pixel pair comprising two pixels from scan lines respectively above and below the pixel, each pixel pair for the first plurality of pixel pairs having a first common direction;
- a first pixel pair difference calculator configured to calculate a first combined difference for the first plurality of pixel pairs from the respective differences for the first plurality of pixel pairs;
- a second pixel pair comparator configured to form the respective differences for a second plurality of pixel pairs, each pixel pair comprising two pixels from scan lines respectively above and below the pixel, each pixel pair for the second plurality of pixel pairs having a second common direction;
- a second pixel pair difference calculator configured to calculate a second combined difference for the second plurality of pixel pairs from the respective differences for the second plurality of pixel pairs;
- an edge existence logic configured to compare the difference between the second combined difference and the first combined difference with an edge threshold to determine whether an edge exists;
- a third pixel pair comparator configured to form the respective differences for a third plurality of pixel pairs, each pixel pair comprising two pixels from scan lines respectively above and below the pixel, each pixel pair for the third plurality of pixel pairs having a third common direction;
- a third pixel pair difference calculator configured to calculate a third combined difference for the third plurality of pixel pairs from the respective differences for the third plurality of pixel pairs; and
- an edge direction calculator configured to compare, if an edge exists, the third combined difference with the first and second combined differences to determine the edge direction.

19. The apparatus of claim 18 wherein each of the third plurality of pixel pairs comprise at least three pixel pairs.

20. The apparatus of claim 18 wherein the calculating of the third combined difference comprises adding the absolute values of each of the respective differences formed from each of the respective pixel pairs for the third plurality of pixel pairs.

21. The apparatus of claim 18 wherein the calculating of the third combined difference further comprises multiplying the added absolute values with a sensitivity factor.

22. The apparatus of claim 18 wherein the third direction is substantially vertical.

23. A method for interpolating a pixel during the deinterlacing of a video signal, the video signal including at least two fields of interlaced scan lines, each scan line including a series of pixels having respective intensity values, comprising the steps of:
- generating a motion value representative of the motion between successive frames about the pixel by segmenting an image into a plurality of multi-pixel segments and comparing the differences with respect to each segment in successive frames;
- detecting an edge direction about the pixel;
- performing an edge adaptive interpolation at the pixel using the detected edge direction; and
- performing a motion adaptive interpolation at the pixel using the generated motion value;
- wherein at least six fields of information are utilized to generate the motion value information.

24. An apparatus for interpolating a pixel during the deinterlacing of a video signal, the video signal including at least two fields of interlaced scan lines, each scan line including a series of pixels having respective intensity values, comprising:

a motion value generator configured to generate a motion value representative of the motion between successive frames about the pixel by segmenting an image into a plurality of multi-pixel segments and comparing the differences with respect to each segment in successive frames;

an edge direction detector configured to detect an edge direction about the pixel;

an edge adaptive interpolator configured to perform an edge adaptive interpolation at the pixel using the detected edge direction; and a motion adaptive interpolator configured to perform a motion adaptive interpolation at the pixel using the generated motion value;

wherein at least six fields of information are utilized to generate the motion value information.

* * * * *